(12) United States Patent
Kapadia et al.

(10) Patent No.: US 8,099,432 B2
(45) Date of Patent: *Jan. 17, 2012

(54) EFFICIENT PAGING OF SEARCH QUERY RESULTS

(75) Inventors: Arshish Kapadia, Issaquah, WA (US); Mark Zeller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 381 days.

This patent is subject to a terminal disclaimer.

(21) Appl. No.: 12/366,430

(22) Filed: Feb. 5, 2009

(65) Prior Publication Data

US 2009/0144250 A1    Jun. 4, 2009

Related U.S. Application Data

(63) Continuation of application No. 11/653,580, filed on Jan. 16, 2007, now Pat. No. 7,505,973.

(51) Int. Cl.
  *G06F 17/30* (2006.01)
(52) U.S. Cl. ...................................................... 707/781
(58) Field of Classification Search .................. 707/694, 707/706, 707, 732, 754, 770, 781, 783, 785
  See application file for complete search history.

(56) References Cited

U.S. PATENT DOCUMENTS

| | | | |
|---|---|---|---|
| 5,991,878 A | 11/1999 | McDonough et al. | |
| 6,460,036 B1 | 10/2002 | Herz | |
| 6,633,873 B1 | 10/2003 | Nakamura | |
| 6,718,324 B2 | 4/2004 | Edlund et al. | |
| 6,985,948 B2 | 1/2006 | Taguchi et al. | |
| 7,069,254 B2 | 6/2006 | Foulger et al. | |
| 7,120,650 B2 | 10/2006 | Loy et al. | |
| 7,337,468 B2 | 2/2008 | Metzger | |
| 7,379,978 B2 | 5/2008 | Anderson et al. | |
| 7,441,269 B2 | 10/2008 | Jones et al. | |
| 7,788,272 B2 * | 8/2010 | Ray | 707/758 |
| 2002/0083053 A1 | 6/2002 | Richard et al. | |
| 2003/0101341 A1 | 5/2003 | Kettler et al. | |

(Continued)

FOREIGN PATENT DOCUMENTS

WO    2005/066850 A1    7/2005

OTHER PUBLICATIONS

"ISYS Search Software", http://www.isys-search.com/downloads/brochures/ISYS_TRIM.pdf., Feb. 2007.

(Continued)

*Primary Examiner* — Cam-Linh Nguyen
(74) *Attorney, Agent, or Firm* — Hope Baldauff Hartman, LLC

(57) ABSTRACT

Methods and computer-readable media provide for efficient paging of search results in accordance with the access rights of a user. According to various implementations, a request for a search query results in a calculated number of search results being retrieved and analyzed for user access rights. As documents having user access rights are located, session state information corresponding to the number of located documents having user access rights and to the number of analyzed documents required to locate the number of documents having user access rights is maintained. This information is used to dynamically alter the number of subsequent documents that are retrieved in order to fill a page of results. This minimizes redundant determinations of user access rights and minimizes the number of documents required to be retrieved and analyzed in order to fulfill a search query request.

8 Claims, 7 Drawing Sheets

U.S. PATENT DOCUMENTS

| | | |
|---|---|---|
| 2003/0187848 A1 | 10/2003 | Ghukasyan et al. |
| 2005/0038775 A1 | 2/2005 | Haveliwala et al. |
| 2005/0144189 A1 | 6/2005 | Edwards et al. |
| 2005/0198277 A1 | 9/2005 | Wada et al. |
| 2005/0216468 A1 | 9/2005 | Fujiwara et al. |
| 2005/0289127 A1 | 12/2005 | Giampaolo et al. |
| 2006/0156031 A1 | 7/2006 | Sturms et al. |
| 2006/0168222 A1 | 7/2006 | Saxena |
| 2008/0005565 A1 | 1/2008 | Shiga et al. |
| 2008/0034057 A1 | 2/2008 | Kumar et al. |

OTHER PUBLICATIONS

"SPxConnect Enterprise Search", http://www.xmlaw.net/datasheets/XMLAW%20SPxConnect%20Enterprise%20Search.pdf, 2007.

International Search Report mailed Jun. 25, 2008 in International Application No. PCT/US2008/051184.

* cited by examiner

EFFICIENT PAGING OF SEARCH QUERY RESULTS

CROSS REFERENCE TO RELATED APPLICATIONS

This patent application is a continuation of co-pending U.S. patent application Ser. No. 11/653,580, entitled "Efficient Paging of Search Query Results," filed Jan. 16, 2007, which is expressly incorporated herein by reference in its entirety.

BACKGROUND

Enterprise search systems allow content within an organization to be indexed, searched, and displayed to authorized users within the organization. In order to provide this functionality, enterprise search engines typically must index and query against structured and unstructured data and documents stored by multiple, independent, third-party enterprise software applications and systems. For instance, in many cases an enterprise search system must index and query against data stored in intranets, document and content management systems, file servers, corporate desktops, business applications such as customer relationship management and business intelligence applications, and other types of content stores.

In contrast to public search engines that search publicly available data and allow virtually any user to execute queries on the data, such as World Wide Web ("Web") search engines, enterprise search systems generally index data for which access may be limited. For instance, a document indexed by an enterprise search system may have an associated access control list that includes one or more access control entries that identify the access rights a user has to the document. As a result, when an enterprise search system executes a query, it must ensure that the user executing the query has sufficient access rights to view the search results returned in response to the query.

When a typical user executes a query for desired data, the expectation is that the results will be displayed in an organized manner that allows for efficient browsing of the returned documents. For example, the search results are usually displayed in groups such as ten results per page and sorted according to some type of hierarchy such as by relevance to the search terms input by the user. The user may also be given information as to the total number of results located and number of pages of results.

This manner of displaying search results to a user becomes problematic for several reasons in the context of enterprise search systems that must ensure that the user has access rights to the search results prior to providing the user with access to the results or with information regarding the existence of the results. First, knowledge of the existence of documents that are relevant to the search terms but are not available to the user due to a lack of access rights undesirably provides the user with information that he may be able to exploit. For this reason, only information pertaining to results that the user has access rights to should be provided to the user.

For example, although the number of documents located during the search query is easily determined, it cannot be provided to the user unless the user has authorization to access every document. The alternative, providing the number of results located from the search query that the user will have authorization to access, is difficult to provide to the user without retrieving each document that is relevant to the search terms and determining whether the user has access rights to those documents, an action that is time consuming and expensive. Additionally, paging between previously visited pages may require an enterprise search system to redundantly determine the access rights for results already displayed to the user on previously visited pages since data used to track previously visited result pages may not be saved on a Web server in a stateless server architecture.

It is with respect to these considerations and others that the disclosure made herein is provided.

SUMMARY

Methods and computer-readable media are provided herein for paging search results in accordance with the access rights of a user. Through the use of the methods and computer-readable media presented herein, the number of search results that a user is authorized to view may be estimated without the need to evaluate the access rights to each of the search results. Moreover, pages of search results may be trimmed and provided in a manner that does not require re-trimming results contained in previous pages and that does not require the storage of state information at a Web server computer.

According to one method presented herein, a request to perform a search query is received. The request includes an indicator of the maximum number of documents to be displayed on a results page at a client computer. A calculated quantity of relevant documents is then retrieved that is greater than the maximum number of results to be displayed on a results page by a predetermined amount. User access rights are then determined for the retrieved documents and session state information is maintained. The session state information includes one or more pairs of values, each pair having a first value representing a quantity of documents for which the user has access rights and a second value representing a quantity of documents for which the access rights have been evaluated.

According to one implementation, determining user rights includes analyzing the first retrieved document and determining whether the user is authorized to view it. If not, then the next document is selected and a determination is made as to whether the user is authorized to view it. This process continues until a document is found for which the user is authorized to view. When this occurs, the document is selected for display. A determination is then made as to whether the a full page of results has been obtained. If so, then the client computer is instructed to store updated session state information and to display the documents for which the user has access rights. However, if the first value is not equivalent to the maximum number of documents to be displayed on the results page, then an additional number of documents are retrieved utilizing the session state information. Access rights are then determined for the additional documents until the quantity of documents for which the user has access rights will fill the results page. The client computer is then instructed to display the documents for which the user has access rights.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
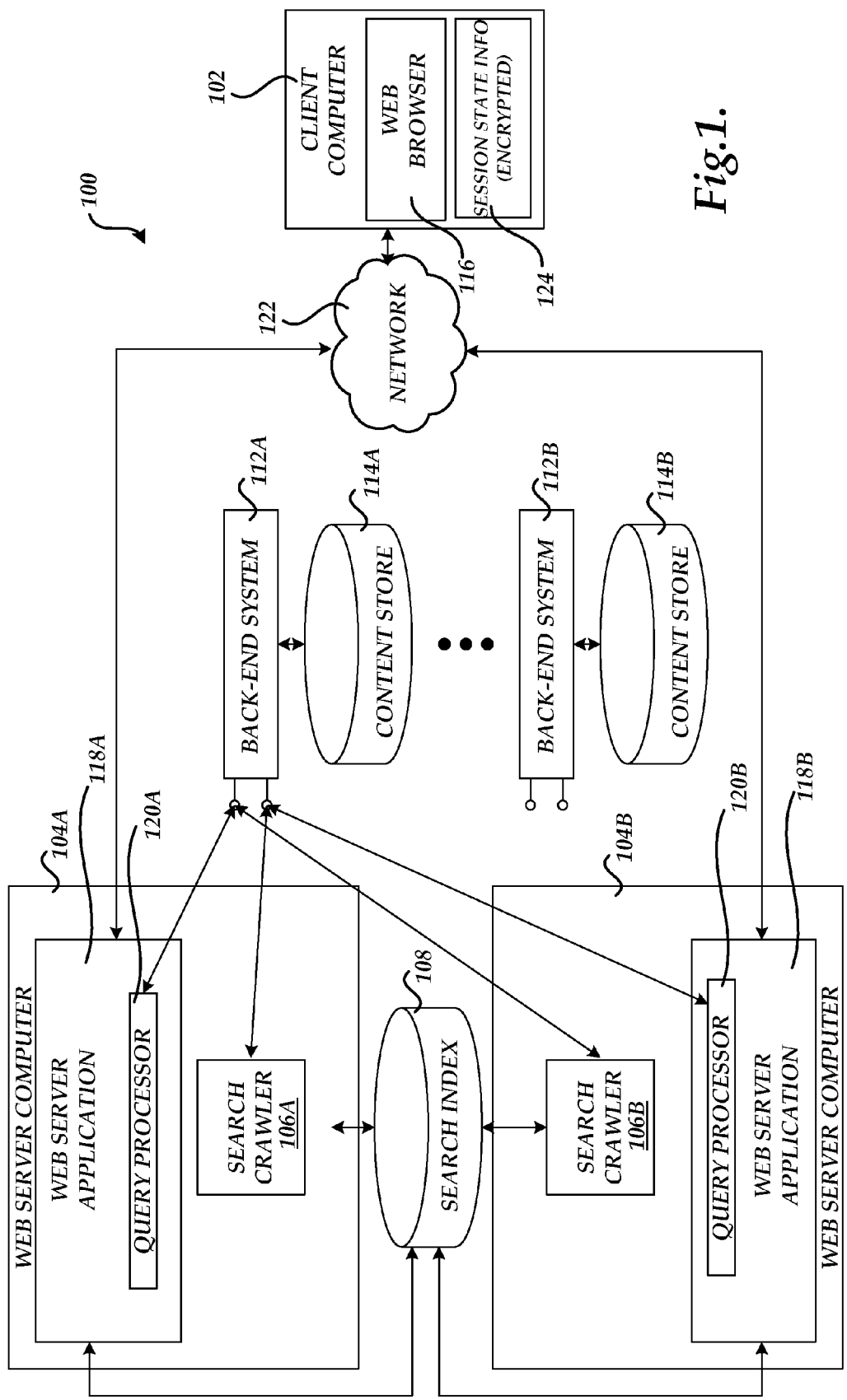
FIG. 1 is a network and software architecture diagram showing an illustrative operating environment for the processes and computer systems described herein, and several of the software components utilized by the computer systems described herein.

The following detailed description is directed to systems, methods, and computer-readable media for providing efficient paging of search results in accordance with the access rights of a user. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that the embodiments presented herein may be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing efficient paging of search results in accordance with the access rights of a user will be described. In particular, FIG. 1 is a computer software architecture and network diagram illustrating one operating environment 100 for the subject matter described herein that includes a client computer 102, a network 122, and one or more Web server computers 104A-104B.

As shown in FIG. 1, the client computer 102 and the Web server computers 104A-104B are communicatively coupled to one another through respective connections to the network 122. According to one implementation, the network 122 comprises the Internet. However, it should be appreciated that the network 122 may comprise a LAN, WAN, or other type of network suitable for connecting the client computer 102 and the Web server computers 104A-104B. The Web server computers 104A-104B are also coupled to one or more back-end systems 112A-112B. The back-end systems 112A-112B are computing systems capable of storing documents in content stores 114A-114B, respectively. As used herein, the term document means any indexable unit of data. Additional details regarding the operation of the back-end systems 112A-112B are provided below.

FIG. 1 also illustrates a number of software components utilized by the client computer 102 and the Web server computers 104A-104B. In particular, the Web server computers 104A-104B are operative to execute the search crawlers 106A-106B, respectively. The search crawlers 106A-106B are application programs designed to gather documents from a variety of sources, such as documents stored in the content stores 114A-114B of the back-end systems 112A-112B, respectively. It should be appreciated that the search crawlers 106A-106B may be stored and executed on one or more computers other than the Web server computers 104A-104B. The back-end systems 112A-112B may each comprise any type of computing system utilized to store content, such as an intranet server, a document or content management system, a file server, a corporate desktop, a business application such as a customer relationship management application or a business intelligence application, or another type of content store.

In order to perform this document identification and indexing process, the search crawlers 106A-106B are seeded with information about content stores. The search crawlers 106A-106B then retrieve documents from the content stores, index the documents, and store the indexed content and any associated metadata in a database called the search index 108. The search crawlers 106A-106B may also identify links to other documents contained in each document and follow the links to obtain and index additional documents. This process is referred to as "crawling."

According to one implementation, the client computer 102 includes a Web browser program (referred to herein as a "browser") 116. The browser 116 is operative to request, receive, and display information pages, such as Web pages, from the server computers 104A-104B. In particular, the browser 116 is operative to establish a connection with one of the Web server applications 118A-118B executing on the server computers 104A-104B. Through the connection, the browser 116 may request a Web page for executing a query of the search index 108. It should be understood that the operations described herein as being executed by the browser 116 may alternatively be executed by any other software application using public application program interfaces.

A query request is processed by a query processor 120A-120B executing on the Web server computer 104A-104B that fields the query request. It should be appreciated that the query processors 120A-120B may be stored and executed on one or more computers other than the Web server computers 104A-104B. The client computer 102 may also store session state information 124 provided by the query processors 120A-120B. The session state information 124 will be described in more detail below.

The query processors 120A-120B respond to user queries by identifying the documents in the search index 108 that contain the keywords in the user query. The query processors 120A-120B also evaluate whether or not each document should be returned as a search result based upon whether the user performing the query has sufficient access rights to view each document. As will be described in greater detail below, each query processor 120A-120B may dynamically query the back-end systems 112A-112B for access rights indicating whether the user executing the query has permissions to view each document in the search results. Alternatively, during the crawl process, the search crawlers 106A-106B may also obtain the access rights for each document that is indexed. For instance, the search crawlers 106A-106B may obtain a list of authorized users for each document. In this latter implementation, the query processors 120A-120B utilize the previously persisted access rights obtained by the search crawlers 106A-106B to determine whether a search result should be returned to a user at query time. Either of these methods, or a combination of these methods, may be utilized to obtain the access rights for a user in the implementations described herein.

Turning now to FIGS. 2-4B, illustrative routines will be described for processing search query requests having one or more pages of authorized results according to various embodiments presented herein. Following the description of FIGS. 2-4B, an example of a paging process, as illustrated in FIGS. 2-4B, for providing search query results and associated information to a user in accordance with the access rights of a user will be described.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination. It should also be appreciated that the logical operations described herein may contain additional or fewer operations than described and may be executed in any order without departing from the scope of this disclosure.

Figure 2:
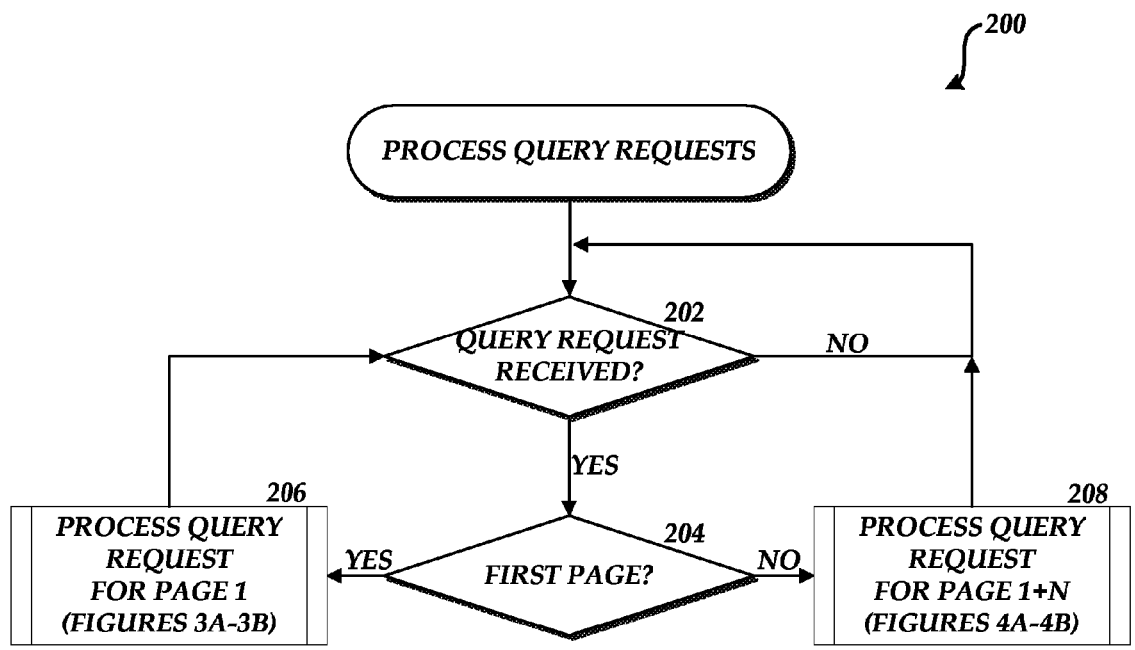
FIG. 2 is a flow diagram illustrating processes provided herein according to embodiments for processing search query requests.

FIG. 2 shows an illustrative routine 200 for processing search queries. The routine 200 begins at operation 202, where a query processor 120 makes a determination as to whether a request for a search query has been received. If the query processor 120 has not received a query request, the routine 200 returns to operation 202 and continues to monitor for query requests. However, if at operation 202 it is determined that a query request has been received, then the routine 200 proceeds to operation 204, where the query processor 120 determines if the search query request is for a first page of results. If the search query request is for the first page of results, then the routine 200 continues to operation 206 and the query processor 120 processes the query request for the first page of results. An illustrative routine 300 for processing a first page of results is described below with respect to FIGS. 3A and 3B.

After the first page of results is generated, the routine 200 returns to operation 202 and the query processor 120 continues to monitor for query requests. However, if the query processor 120 determines at operation 204 that a search query request is for any results page other than the first page of results, then the routine 200 proceeds to operation 208 and the query processor 120 processes the query request for the requested page of results. An illustrative routine 400 for generating pages of search results subsequent to the first page is described below with respect to FIGS. 4A and 4B. From operation 208, the routine 200 returns to operation 202 where the query processor 120 continues to accept query requests.

Figure 3A:
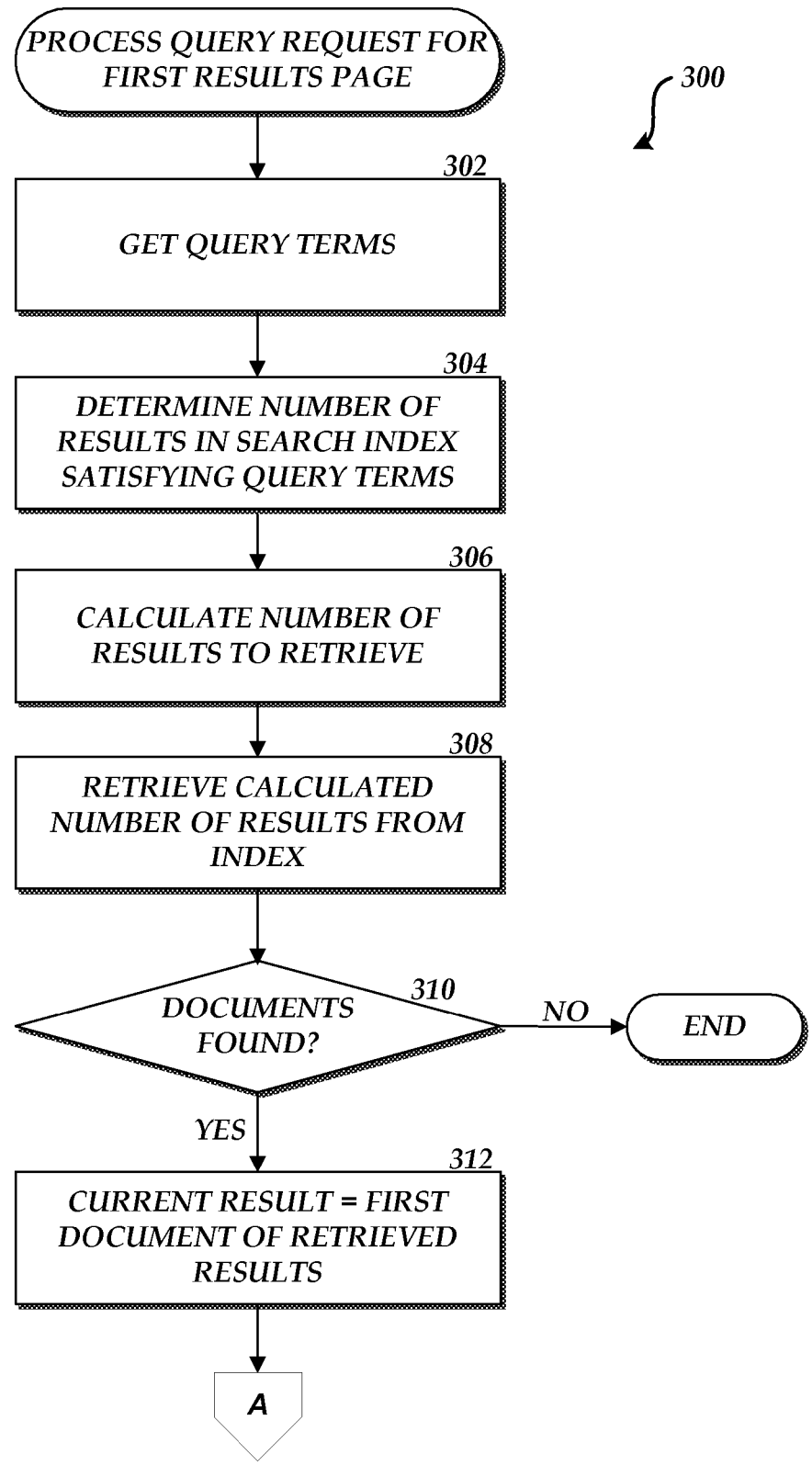
FIGS. 3A and 3B are flow diagrams illustrating a process provided herein according to embodiments for processing a search query request to provide a first page of search results.
Figure 3B:
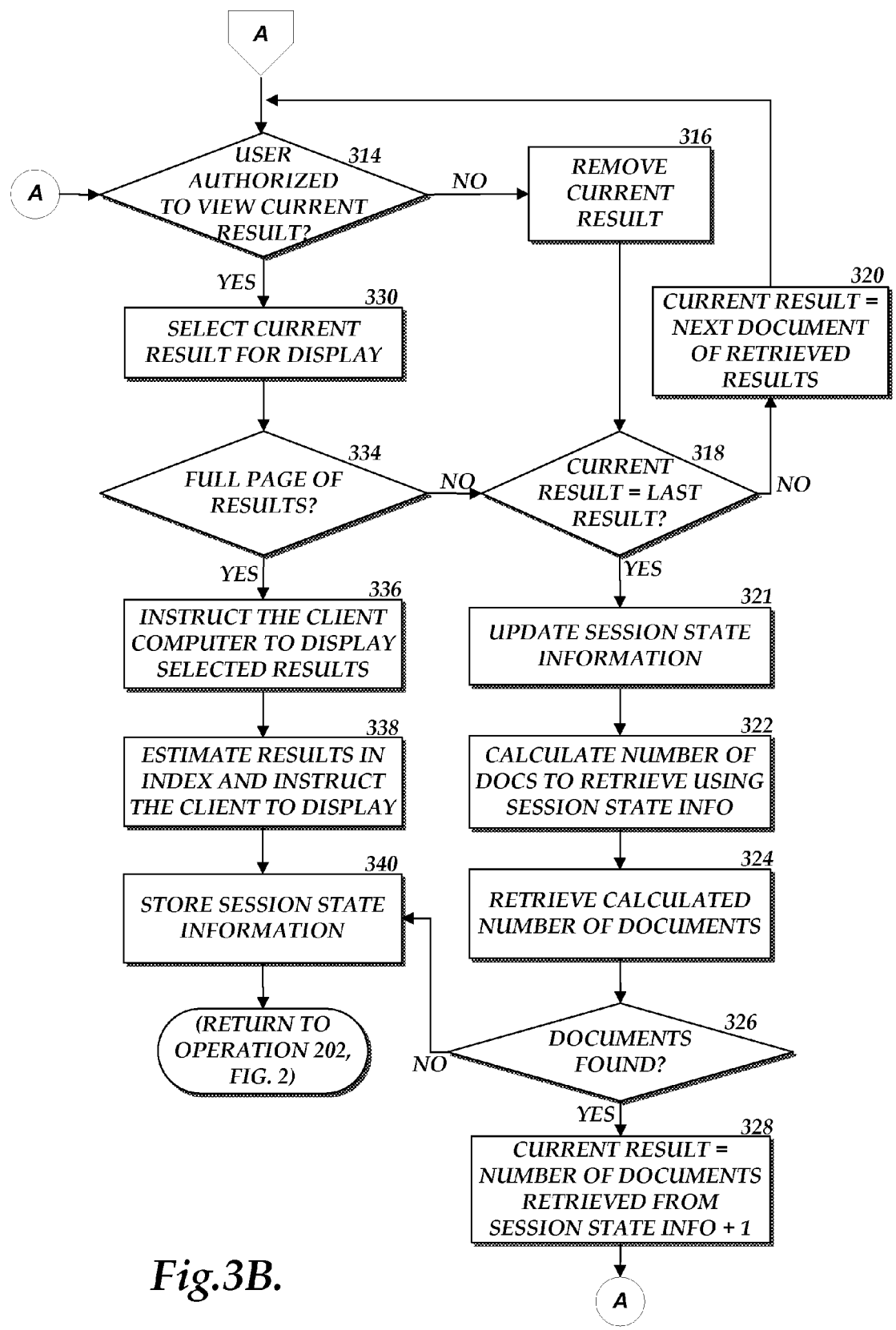

Turning to FIG. 3A, an illustrative routine 300 for processing a query request for a first page of search results will be described. The routine 300 begins at operation 302, where the query processor 120 receives query terms. The routine 300 continues to operation 304, where the query processor 120 determines the number of results in the search index 108 that are relevant to the query terms. As stated above, this number will not be reported to the user that requested the query since the user may not be authorized to access to all of the results.

From operation 304, the routine 300 continues to operation 306, where the query processor 120 calculates the number of results to retrieve. While it is not relatively performance intensive, which correlates to expense, for the query processor 120 to determine the number of results in the search index 108 that are relevant to the query terms, it is performance intensive to retrieve all of these results and determine whether the user has authorization to access each one prior to displaying the search results to the user. For this reason, according to implementations presented herein, the query processor 120 may retrieve only a determined number of results greater than the number of results displayed on a page. As will be described below, the query processor 120 may determine whether the user has authorization to access each one of the results within this smaller subset of the total number of results determined in operation 304 in an effort to retrieve a full page of results that the user is authorized to access without having to retrieve and trim the entire set of results for security. It should be understood that "security trimming" is the process by which the query processor 120 removes documents from the query results for which the requesting user does not have sufficient access rights.

As stated above, at operation 306, the query processor 120 calculates the number of results to retrieve in an effort to retrieve a full page of authorized results. The number of results that the query processor 120 will retrieve and trim for security will be some predetermined percentage more documents than the number of documents that may be displayed on a page. According to one implementation, the query processor 120 will retrieve 50% more documents than can be displayed on a page. After the query processor 120 calculates the number of results to retrieve at operation 306, the routine 300 continues to operation 308, where the query processor 120 retrieves the calculated number of results listed in the search index 108. These documents are retrieved from one or more content stores 114A-114B via the back-end systems 112A-112B.

The routine 300 then continues from operation 308 to operation 310, where the query processor 120 determines whether documents were located. It is possible that the calculated number of results to retrieve at operation 306 may be greater than the number of available results or the documents may be otherwise unavailable. If it is determined that documents are not found at operation 310, then the routine 300 ends. However, if it is determined at operation 310 that documents were found, then the routine 300 continues to operation 312, where the first document in the retrieved results is set as the current result for security trimming purposes.

From operation 312, the routine 300 proceeds to operation 314, where the query processor 120 determines whether the user is authorized to view the current result. The query processor 120 may make this determination from security information provided by a search crawler 106A-106B during the indexing process or through the use of a call to a third party security trimmer. If the query processor 120 determines that the user is not authorized to view the current result, then the routine 300 continues from operation 314 to operation 316, where the current result is removed from a list of authorized results to be displayed to the user. The routine 300 then proceeds to operation 318, where the query processor 120 determines whether the current result is the last result in the subset of results retrieved at operation 308. If the query processor 120 determines that the current result is not the last result, then the routine 300 continues to operation 320, where the next document of the retrieved results is set as the current result. The routine 300 returns from operation 320 to operation 314 where the security trimming process continues.

Returning to operation 318, if the query processor 120 determines that the current result is the last result, then the query processor 120 must retrieve an additional subset of results until the security trimming process results in a full page of documents. Consequently, the routine 300 proceeds to operation 321, where the query processor 120 updates the current session state information 124. The session state information 124 includes a relatively small amount of data representing information about the previous search and security trimming results. According to implementations described herein, the session state information 124 includes one or more pairs of values that may be stored at the client computer 102. The first value of each pair of values represents the number of documents that have been evaluated that the user is authorized to view. The second value of each pair of values represents the number of documents that have been scanned in order to arrive at the corresponding first value.

For example, a session state value of (2, 15) indicates that out of 15 documents evaluated, the user is authorized to view two documents. Each pair of values represents a subset of results that has been scanned by the query processor 120. Accordingly, each time that the query processor 120 determines at operation 318 that the current result is the last result of the subset being scanned, a new pair of values will be added to the session state information 124. For example, if the session state information 124 was (2, 15) prior to determining that the user is authorized to view the $17^{th}$ document, and that the $17^{th}$ document is the last result in the subset being scanned, then (3, 17) is added to the session state information 124 to arrive at the updated session state information 124 that includes (2, 15) (3, 17). This updating operation occurs locally at the Web server computer 104A-104B by adding the appropriate session state value pair without storing the updated session state information 124 at the client computer 102. The session state information 124 will be stored at the client computer 102 once a full page of results is obtained, as will be described below.

From operation 321, the routine 300 proceeds to operation 322, where the query processor 120 calculates the number of documents to retrieve in order to fill the page with authorized results. As stated above, the query processor 120 retrieves a number of search results greater than the number of results to be displayed on the page. According to implementations described herein, with each subsequent subset of results that is retrieved by the query processor 120 after the first subset is retrieved, the number of results to be retrieved dynamically changes according to the previous results of the security trim process.

Because it is difficult to predict how many results out of the first subset of documents retrieved by the query processor 120 that the user will be authorized to access, the query processor 120 retrieves a predetermined percentage of documents more than the number of documents that can be displayed on a page in order to allow for a number of documents to be trimmed out of the results. However, as the security trimming process progresses for a given user, the actual results of the trimming process provide a more accurate prediction of future security trimming results. Therefore, implementations of the disclosure presented herein provide for dynamically changing the number of documents retrieved for security trimming to fill a page of results.

To dynamically calculate the number of documents to retrieve based on previous security trimming results, the query processor 120 utilizes the session state information 124, which provides information pertaining to the previous security trimming results. One implementation of this calculation will be described below with respect to an illustrative example. The routine 300 then continues from operation 322 to operation 324, where the query processor 120 retrieves the calculated number of documents. At operation 326, the query processor 120 determines whether documents were located. If no further documents are available for retrieval, or if the documents are otherwise unavailable, the routine 300 proceeds to operation 340 where the session state information 124 is stored at the client computer as described below.

However, if documents are located at operation 326, then the routine 300 continues to operation 328. At operation 328, the first document after the number of documents scanned, as indicated by the second value of the most recently added pair of values of the session state information 124, is set to the current result. The routine 300 then returns to operation 314, where the security trimming process continues for the new subset of results as described above for the first subset of results. As an example, if the session state information 124 indicates that 15 documents were scanned in the first subset of retrieved results, then although the documents retrieved in the second subset of retrieved results includes the 15 documents retrieved in the first subset of retrieved results, the security trimming process begins with the $16^{th}$ document so that the trimming process is not repeated for those documents that have already been scanned.

Returning now to operation 314, if the query processor 120 determines that the user is authorized to view the current result, then the routine 300 proceeds to operation 330, where the current result is selected for display. From operation 330, the routine 300 continues to operation 334, where the query processor 120 determines whether the number of authorized results identified in the security trimming process is equal to the number of results to be displayed on a results page. For example, if the results page is configured to display ten results at a time and ten authorized results have been identified, then the query processor 120 would determine that a full page of results has been identified. This determination is made by comparing the first value of the session state information 124 with the number of results to be displayed on the results page. If the query processor 120 determines that a full page of results has not been identified, then the routine 300 proceeds to operation 318 and continues as described above. However, if the query processor 120 determines at operation 334 that a full page of results has been identified, then the routine 300 continues to operation 336, where the query processor 120 instructs the client computer 102 to display the selected results.

The routine 300 continues from operation 336 to operation 338, where the query processor 120 estimates the number of results found in the search index 108 that the user will be authorized to view. This estimation is based on the session state information 124 and will be described below with respect to the illustrative example. The query processor 120 then instructs the client computer 102 to display the estimation for the user. From operation 338, the routine 300 continues to operation 340, where the query processor 120 sends the updated session state information 124 to the client computer 102 for storage. In order to maintain the stateless architecture of the Web server computers 104A-104B, the session state information 124 is stored on the client computer 102.

The session state information 124 is useful in that it may be utilized by the query processor 120 to identify a starting location for security trimming, and therefore prevents redundant re-trimming that is time consuming and expensive. It should be understood that the session state information 124 may be passed to the client computer 102 as a cookie or as an ASP.NET view state component. In order to prevent a user from being able to gain any knowledge as to the existence of documents matching his search criteria that he does not have access rights to, the session state information 124 may be encrypted prior to transmission from the query processor 120 to the client computer 102. From operation 340, the routine 300 returns to operation 202 where the query processor 120 receives further search query requests.

Figure 4A:
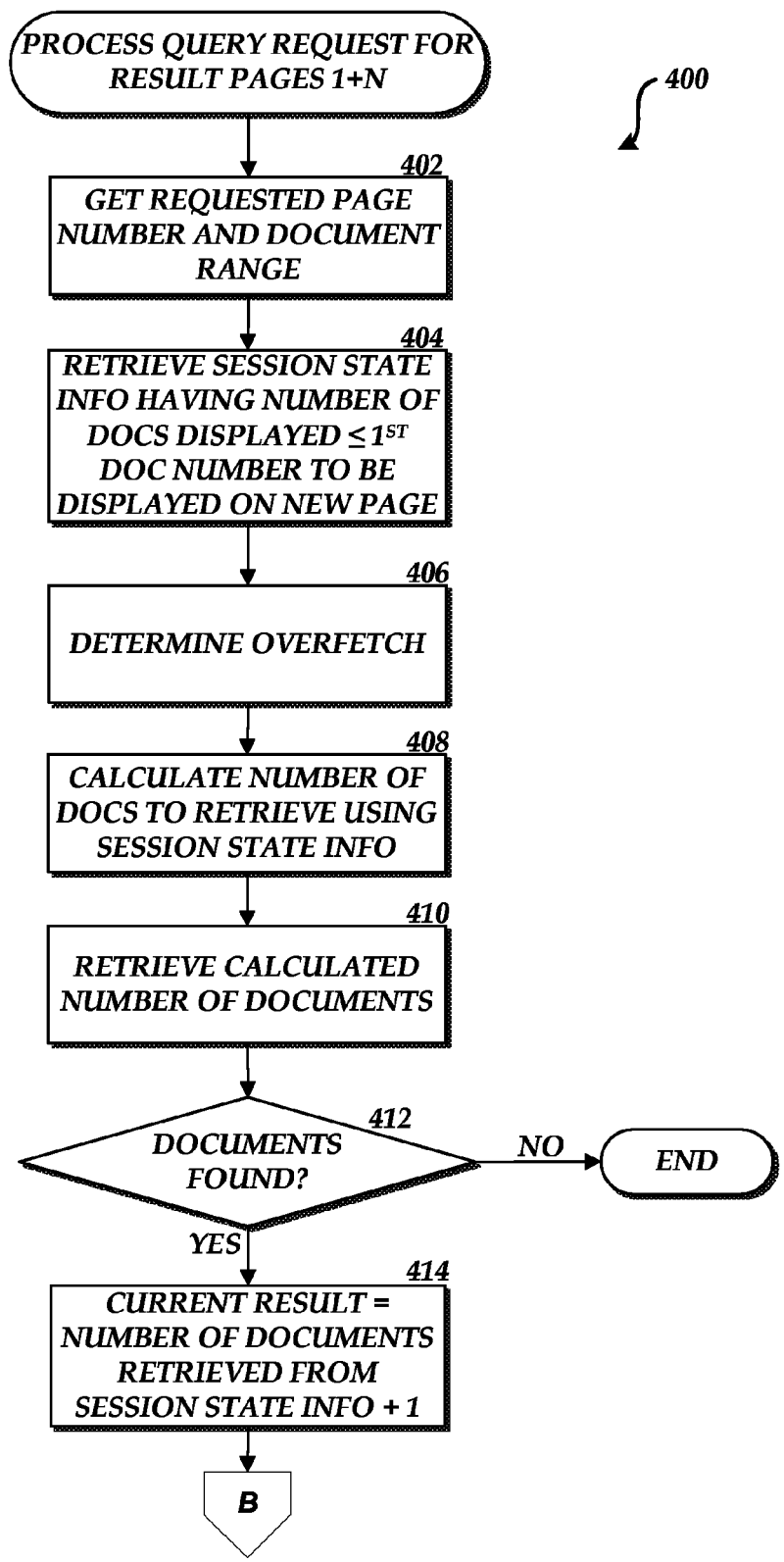
FIGS. 4A and 4B are flow diagrams illustrating a process provided herein according to embodiments for processing a search query request to provide a page of search results subsequent to the first page of results.
Figure 4B:
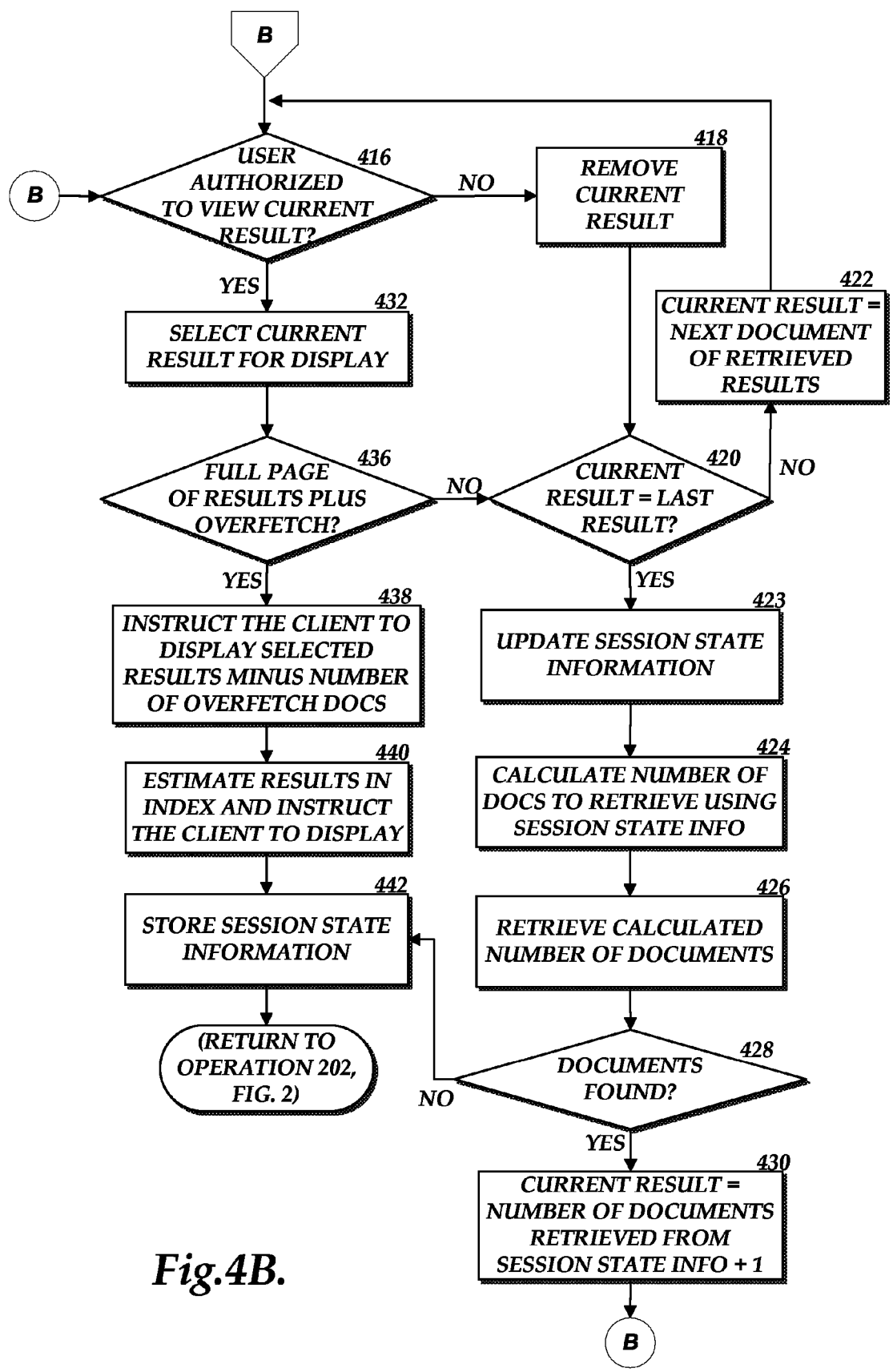

Turning now to FIGS. 4A and 4B, an illustrative routine 400 will be described for processing a search query request to provide a page of search results other than the first page of results. The routine 400 begins at operation 402, where the query processor 120 receives the requested page number and document range. For example, although the user may have retrieved the first page of results with ten results shown on the page, implementations described herein provide for the user subsequently requesting the third page of results with 15 results shown on the page. From operation 402, the routine 400 continues to operation 404, where the query processor 120 retrieves the pair of values from the session state information 124 that has a first value representing the number of results previously identified to be authorized for viewing by the user that is less than or equal to the first document number to be displayed on the new page.

In order for the results for the newly requested page to be retrieved and trimmed without having to retrieve and re-trim all of the documents on the preceding result pages, the query processor 120 must determine then number of documents that can be skipped because they have already been trimmed. Therefore, the query processor 120 searches for the pair of values from the session state information 124 that has a first value less than or equal to the number of the first document to be displayed on the requested page. The second value stored with that instance of session state information 124 represents the number of documents that the query processor 120 may skip before initiating the next security trimming process.

For example, if the user requests page two of the results, but changes the number of displayed results per page to five documents from ten documents previously displayed, then the query processor 120 looks for the pair of values from the session state information 124 that has a first value less than six since the first document displayed on page two will be the sixth document that the user is authorized to view. Assume in this example that the session state information 124 includes two pairs of values, (4, 10) (10, 28). The value pair (10, 28) would be of little use to the query processor 120 since it represents that 28 documents were scanned to locate ten documents that the user is authorized to access. It does not provide any information as to how many results the query processor 120 may skip before identifying the sixth document that the user is authorized to view. So, the query processor 120 retrieves the value pair (4, 10) since the first value, four, is less than the number of the first result to be displayed on the requested page, six.

This session state information 124 provides the query processor 120 with the information that the first ten results may be skipped since they only provide four authorized results. The query processor 120 will begin the security trimming process with document number 11. However, the first document that the query processor 120 locates for display will not be displayed since it will be the fifth document and the user has requested documents six through ten. The document that will be discarded is called the "overfetch." The overfetch is the number of documents that will need to be scanned and discarded prior to identifying and displaying the requested results to the user. The query processor 120 attempts to locate the session state information 124 that is the closest to the number of the first document to be displayed in order to minimize the overfetch. If, for example, the user had not changed the number of documents to be displayed per page, the overfetch would be zero since the session state information 124 associated with the last result displayed on the previous page would be stored at the client computer 102. The overfetch will be described below with respect to an illustrative example.

Returning to FIG. 4A, the routine 400 continues from operation 404 to operation 406, where the overfetch is determined by the query processor 120. From operation 406, the routine 400 continues to operation 408, where the query processor 120 calculates the number of results to retrieve using the session state information 124 retrieved at operation 404. This calculation may be similar to the calculation performed at operation 306 as described above for retrieving the first subset of results for the first page of results to be displayed. The difference is that after calculating the number of documents to retrieve based on the predetermined percentage of documents greater than the number of documents to be displayed on the requested page of results, the number of documents to be skipped according to the session state information 124 is added to the number of documents to retrieve to arrive at a total subset of documents for retrieval.

After the query processor 120 calculates the number of results to retrieve at operation 408, the routine 400 continues to operation 410, where the query processor 120 retrieves the calculated number of results. The routine 400 continues from operation 410 to operation 412, where the query processor 120 determines whether the documents were located. If it is determined that the documents are not found at operation 412, then the routine 400 ends. However, if it is determined at operation 412 that the documents were found, then the routine 400 continues to operation 414, where the current result is set as the second value in the most current pair of values from the session state information 124 plus one for security trimming purposes. This means that the query processor 120 will skip the first number of documents that were previously trimmed and begin the security trimming process at the next document.

From operation 414, the routine 400 proceeds to operation 416, where the query processor 120 determines whether the user is authorized to view the current result. If the query processor 120 determines that the user is not authorized to view the current result, then the routine 400 continues from operation 416 to operation 418, where the current result is removed from a list of authorized results to be displayed to the user. The routine 400 proceeds to operation 420, where the query processor 120 determines whether the current result is the last result in the subset of results retrieved at operation 410. If the query processor 120 determines that the current result is not the last result, then the routine 400 continues to operation 422, where the next document of the retrieved results is set as the current result. The routine 400 returns from operation 422 to operation 416 and the security trimming process continues.

Returning to operation 420, if the query processor 120 determines that the current result is the last result, then the query processor 120 will need to retrieve an additional subset of results until the security trimming process results in a full page of documents. Consequently, the routine 400 proceeds to operation 423, where the session state information 124 is updated as described above. The routine 400 continues to operation 424, where the query processor 120 calculates the number of documents to retrieve in order to fill the page with authorized results using the current session state information 124.

From operation 424, the routine 400 continues to operation 426, where the query processor 120 retrieves the calculated number of documents. At operation 428, the query processor 120 determines whether documents were located. If no further documents are available for retrieval, or if the documents are otherwise unavailable, the routine 400 proceeds to operation 442 where the session state information 124 is stored at the client computer 102. However, if documents are located at operation 428, then the routine 400 continues to operation 430, where the first document after the number of documents scanned, as indicated by the second value in the most current pair of values of the session state information 124, is set to the current result and the routine 400 returns to operation 416, where the security trimming process continues for the new subset of results as described above for the first subset of results.

Returning now to operation 416, if the query processor 120 determines that the user is authorized to view the current result, then the routine 400 proceeds to operation 432, where the current result is selected for display. From operation 432, the routine 400 continues to operation 436, where the query processor 120 determines whether the number of authorized results identified in the security trimming process is equal to the number of results to be displayed on a results page plus any amount of overfetch determined at operation 406. If the query processor 120 determines that a full page of results plus the overfetch has not been identified, then the routine 400 proceeds to operation 420 and continues as described above. However, if the query processor 120 determines at operation 436 that a full page of results plus the overfetch has been identified, then the routine 400 continues to operation 438, where the query processor 120 instructs the client computer 102 to display the selected results after removing the overfetch amount from the first results identified for the page.

From operation 438, the routine 400 continues to operation 440, where the query processor 120 estimates the number of results found in the search index 108 that the user will be authorized to view. As discussed above, this estimation is based on the session state information 124. The query processor 120 instructs the client computer 102 to display the estimation for the user. From operation 440, the routine 400 continues to operation 442, where the query processor 120 sends the updated session state information 124 to the client computer 102 for storage. From operation 442, the routine 400 returns to operation 202 and the query processor 120 monitors for further query requests.

An illustrative example will now be presented according to the processes described above with respect to FIGS. 2-4B. It should be understood that the disclosure presented herein is not limited to the calculations presented in the following example. Rather, the example that will be presented is for illustrative purposes as one implementation of the disclosure. The algorithms described may be manipulated without departing from the scope of the present disclosure.

In the example presented below, a user may request, via the Web browser 116 executing on the client computer 102, that a search be conducted for documents relating to specific search terms. The request is received by the query processor 120 associated with the Web server computer 104. The query processor 120 scans the search index 108 for all documents that are relevant to the search terms and compiles a list of results. Because the default configuration of the Web browser 116 for displaying search results is to provide ten results per page, the query processor 120 retrieves 50% more documents than will be displayed on the first page, or 15 documents. The query processor 120 begins with the first document of the 15 retrieved documents and determines whether the user has access rights to that document. After determining that the user does not have access rights to the first document, the query processor 120 removes the first document from a list of possible search results to be displayed, and repeats the process for the second document of the retrieved documents.

For each document that the query processor 120 determines that the user is authorized to view, the query processor 120 selects the document for display. This process is repeated until the number of documents for which the user is determined to have access rights for is equivalent to the number of documents displayed on a results page, ten documents in this example, or until the query processor 120 has trimmed the entire subset of documents that were retrieved, 15 documents in this example, and needs to retrieve additional documents since the results page is not filled. If, for example, the query processor 120 determines that the user only has access rights to view two of the first 15 document, the query processor 120 updates the session state information 124 to (2, 15) to reflect that the user is authorized to view two of the first 15 documents scanned.

The query processor 120 then calculates the number of documents to retrieve in order to identify eight additional documents for display on the results page that will display 10 results to the user. Rather than use the same number of documents retrieved with the first subset of documents, the query processor 120 calculates the number of documents to retrieve as the second subset using the updated session state information 124, which provides a more accurate prediction as to how many additional documents will need to be retrieved and trimmed in order to identify the remaining 8 documents for the first results page.

The number of results to retrieve is the first value of the session state information 124 divided by the second value of the session state information, subtracted from two, then multiplied by the number of results to be displayed on the results page, and finally adding the number of documents that were retrieved and scanned previously. In this example, the calculation is $[(2-(2/15))\times 10]+15=34$ documents. After retrieving the new subset of documents, or 34 documents in this example, the query processor 120 initiates the security trimming process beginning at document number 16 since the first 15 documents have already been trimmed to produce two results as indicated by the session state information 124.

Once the number of results to be displayed on the results page has been identified, then the query processor 120 updates the session state information 124 for storage on the client computer 102. In this example, assume that the remaining eight documents for the first results page were found after scanning 11 documents, starting at document number 16. The new value pair for the session state information 124 would be (2+8, 15+11) or (10, 26). The updated session state information 124 would then be (2, 15) (10, 26). The query processor 120 then estimates the total number of results that the user will be authorized to view out of the total number of documents that were found to be relevant to the search terms. This estimate is based on the security trimming results thus far, which are stored as the session state information 124. In our example, the estimated number of results to present to the user is the number of documents for which the user has been determined to have access rights to view divided by the total number of documents scanned to identify the authorized documents multiplied by the total number of documents that were found to be relevant to the search terms. In our example, assuming 1000 documents were determined to be relevant to the search terms prior to security trimming, then (10/26)×1000=385 documents.

The query processor 120 then encrypts the session state information 124. The session state information 124 is then sent to the browser executing on the client computer 102 for storage. The estimated number of results and the first ten results may also be transmitted to the browser for display to the user. If the user requests another page of results that includes, for instance, documents five through 15, the query processor 120 locates the pair of values from the session state information 124 that has a first value equal to or less than five, the document number of the first document to be displayed on the new results page. The query processor 120 then retrieves (2, 15) from the session state information 124 ((2, 15) (10, 26)) on the client computer 102. The query processor 120 will now be able to skip the security trimming process for the first 15 documents since it is known that the first 15 documents yields two documents that the user is authorized to view. The overfetch for this document retrieval and security trim is two documents since document numbers three and four must be identified prior to identifying the fifth document, which is the first document that will be displayed on the new results page.

Using the value pair (2, 15) from the session state information 124, the query processor 120 retrieves a percentage (50%) of documents greater than the number to be displayed on the results page in addition to the number of documents previously trimmed as indicated from the second value of the session state information 124. Here, the number of documents to retrieve is (1.5×6)+15=24 documents. The query processor 120 will begin the security trimming process on the 16$^{th}$ document. This process is repeated continuously according to the query requests made by the user.

Figure 5:
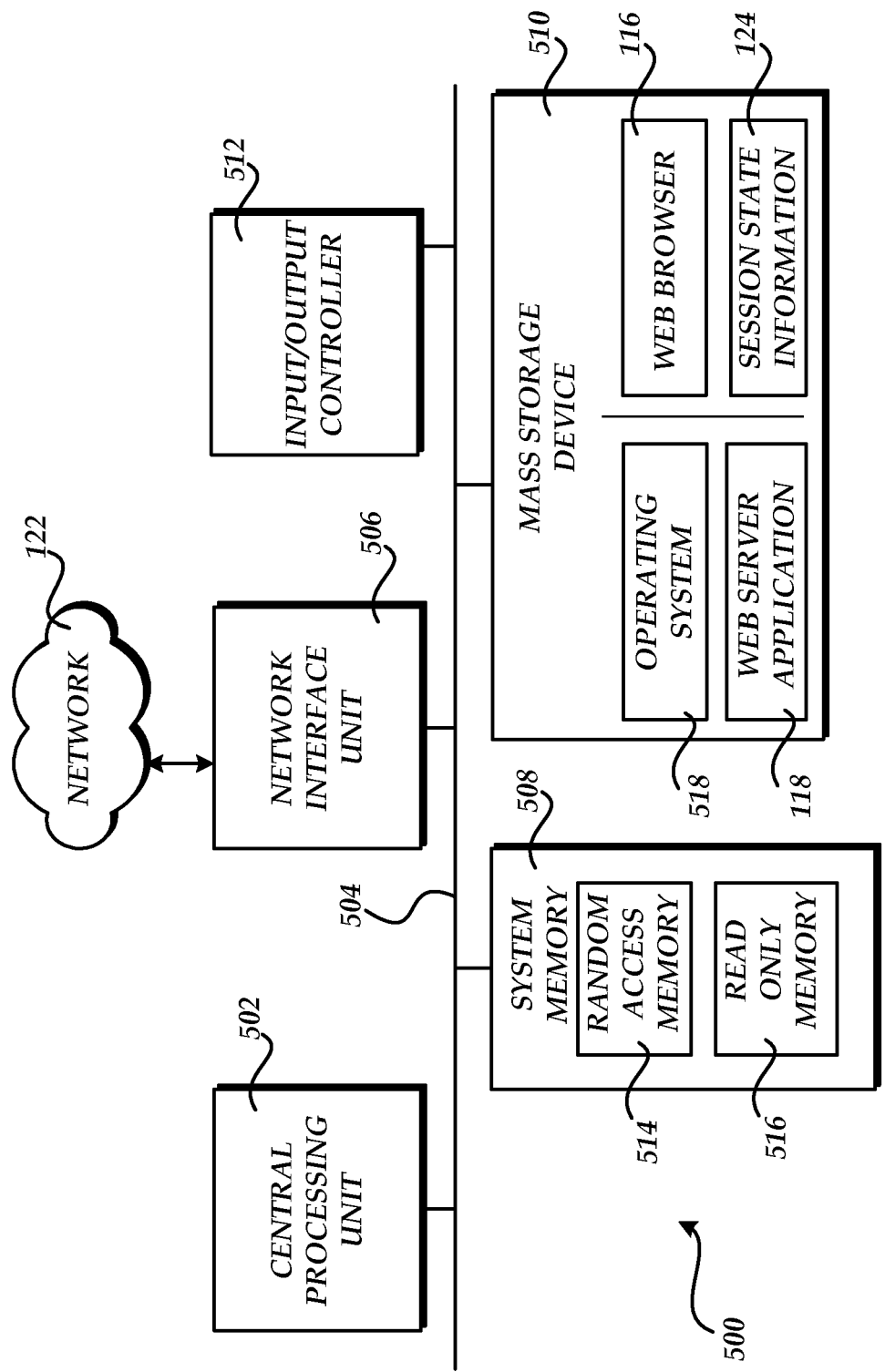
FIG. 5 is a computer architecture diagram showing a computer architecture suitable for implementing the various computer systems described herein.

Referring now to FIG. 5, an illustrative computer architecture for a computer 500 utilized in the various embodiments presented herein will be discussed. The computer architecture shown in FIG. 5 illustrates a conventional desktop, laptop computer, or server computer. The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 122, such as the Internet. The computer 500 may connect to the network 122 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop or server computer, such as the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that although the embodiments presented herein are described in the context of a desktop or laptop client computer 102 and a Web server computer 104, many other types of computing devices and systems may be utilized to embody the various aspects presented herein.

The mass storage device 510 and RAM 514 may also store one or more program modules. In particular, the mass storage device 510 and the RAM 514 may store a Web browser 116, a Web server application 118, session state information 124, and the other program modules described above with respect to FIG. 1. Other program modules may also be stored in the mass storage device 510 and utilized by the computer 500.

Based on the foregoing, it should be appreciated that systems, methods, and computer-readable media for efficient paging of search results in accordance with the access rights of a user are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method of providing search results by a server computer to a client computer, comprising:
   receiving a request at the server computer for a search query from the client computer, the request comprising a maximum number of documents to be displayed on a results page;
   retrieving a number of documents relevant to the search query, the number of documents retrieved greater than the maximum number of results to be displayed on the results page by a predetermined amount;
   determining access rights corresponding to a plurality of retrieved documents;
   maintaining session state information, the session state information comprising a first value representing a number of documents for which a user is determined to have access rights and a second value representing a number of documents for which the access rights have been determined;
   retrieving a number of additional documents relevant to the search query, the number of additional documents determined from the session state information;
   determining access rights for a plurality of the additional documents beginning with a document following the number of documents for which the access rights have been determined; and
   instructing the client computer by the server computer to display documents on the results page for which the user is determined to have access rights.

2. The method of claim 1, wherein determining access rights corresponding to the plurality of retrieved documents comprises determining access rights corresponding to each retrieved document until access rights corresponding to all retrieved documents have been determined.

3. The method of claim 1, wherein determining access rights corresponding to the plurality of retrieved documents comprises determining access rights corresponding to each retrieved document until a number of documents for which the user is determined to have access rights is equivalent to the maximum number of documents to be displayed on the results page.

4. The method of claim 1, further comprising:
   determining an estimate of a total number of documents relevant to the search query for which the user will be determined to have access rights; and
   causing the client computer to display the estimate.

5. The method of claim 4, wherein determining the estimate of the total number of documents relevant to the search query for which the user will be determined to have access rights comprises multiplying a total number of documents relevant to the search query by a quotient obtained by dividing the first value of the session state information by the second value of the session state.

6. The method of claim 1, wherein determining access rights corresponding to the plurality of retrieved documents comprises:
   setting a first document of the number of documents retrieved as a current result;
   determining whether the user is authorized to view the current result;
   if the user is not authorized to view the current result,
      removing the current result,
      setting a next document of the number of documents retrieved as the current result, and
      determining whether the user is authorized to view the current result; and
   if the user is authorized to view the current result,
      selecting the current result for display,
      setting a next document of the number of documents retrieved as the current result, and
      determining whether the user is authorized to view the current result.

7. The method of claim 1, further comprising causing the client computer to store the session state information after the number of documents for which the user is determined to have access rights is equivalent to the maximum number of documents to be displayed on the results page.

8. The method of claim 7, further comprising:
   receiving a request for a subsequent results page, the request comprising a maximum number of documents to be displayed on the subsequent results page that is not equivalent to the maximum number of documents to be displayed on the results page;
   retrieving prior session state information characterized by a first value that is less than a number of a first document to be displayed on the subsequent results page;
   determining a quantity of documents between the first value of the prior session state information and the number of the first document to be displayed on the subsequent results page as overfetch;
   identifying documents relevant to the search request for which the user has access rights; and
   instructing a client computer to display documents on the subsequent results page for which the user is determined to have access rights excluding the overfetch.

* * * * *

UNITED STATES PATENT AND TRADEMARK OFFICE
CERTIFICATE OF CORRECTION

| | | |
|---|---|---|
| PATENT NO. | : 8,099,432 B2 | Page 1 of 1 |
| APPLICATION NO. | : 12/366430 | |
| DATED | : January 17, 2012 | |
| INVENTOR(S) | : Arshish Kapadia et al. | |

It is certified that error appears in the above-identified patent and that said Letters Patent is hereby corrected as shown below:

In column 12, line 20, before "retrieved" insert -- 15 --.

Signed and Sealed this
Twenty-eighth Day of February, 2012

David J. Kappos
*Director of the United States Patent and Trademark Office*